No. 855,515. PATENTED JUNE 4, 1907.
H. J. KIMMAN.
RECIPROCATING TOOL.
APPLICATION FILED JULY 27, 1904.
2 SHEETS—SHEET 1.
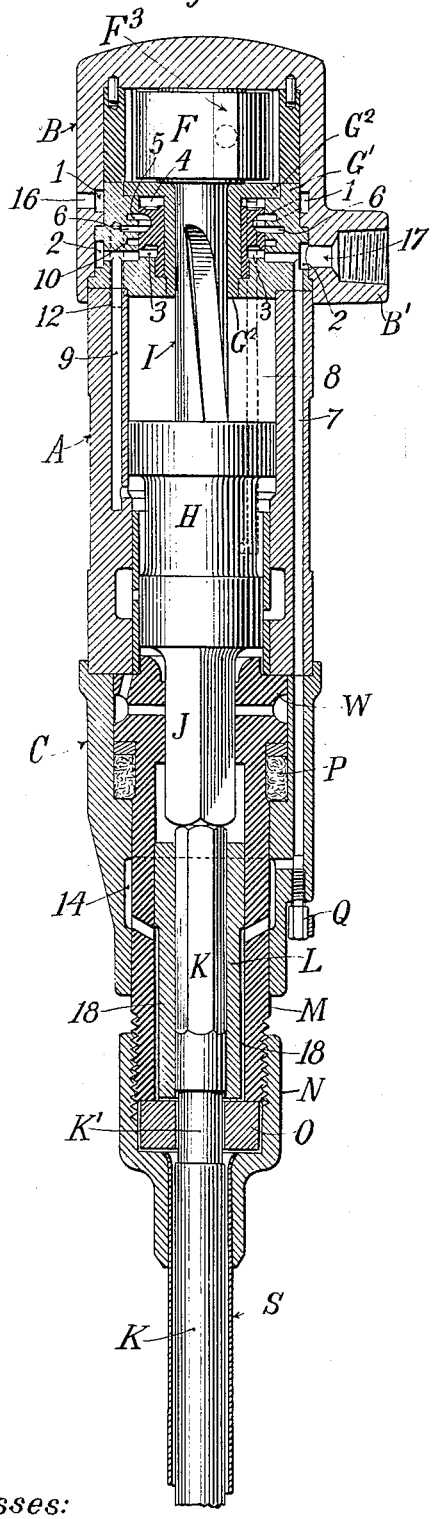
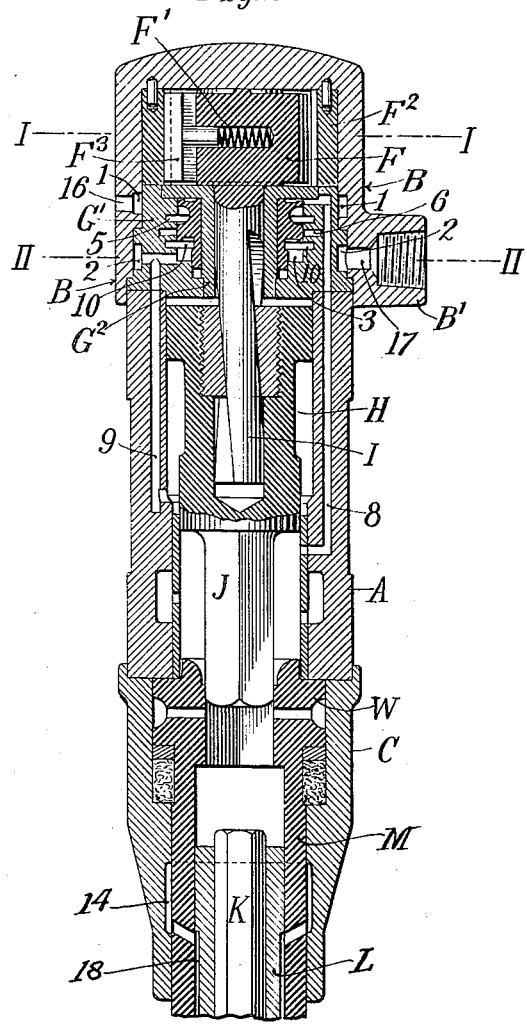
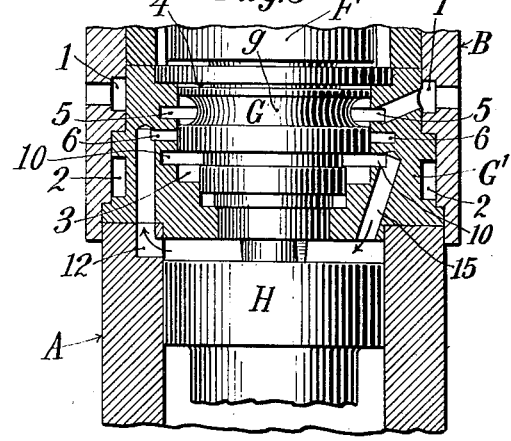
Witnesses:
Raphaël Netter
L. S. Shaw
Henry J. Kimman  Inventor
by E. M. Bentley  Atty

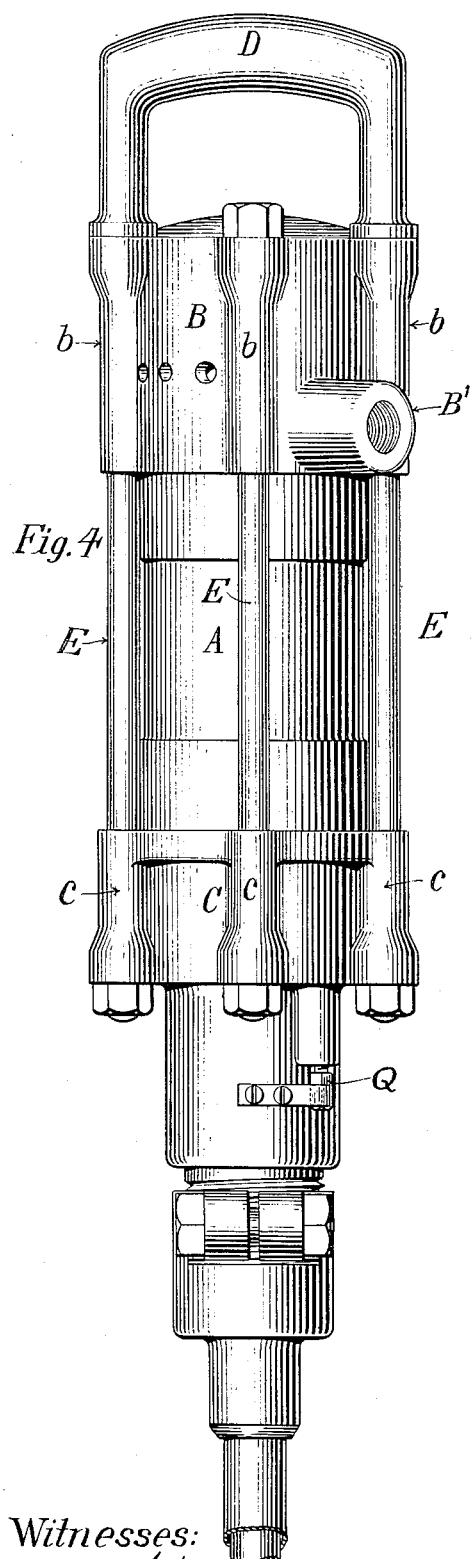
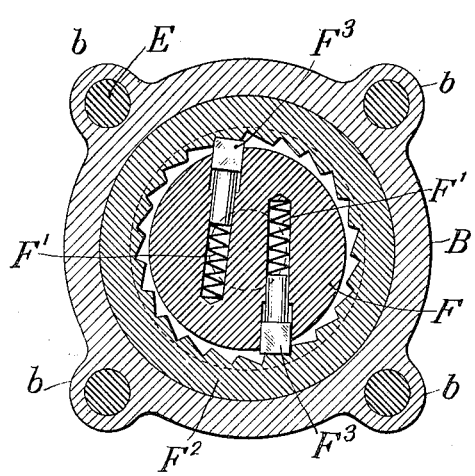
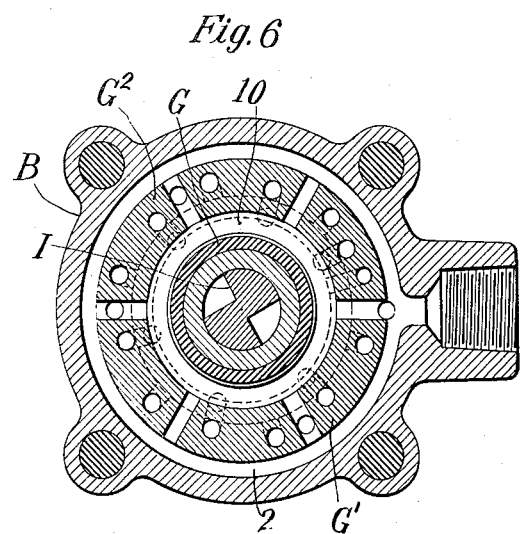

UNITED STATES PATENT OFFICE.

HENRY JAMES KIMMAN, OF CLEVELAND, OHIO, ASSIGNOR TO CHICAGO PNEUMATIC TOOL COMPANY, OF CHICAGO, ILLINOIS, A CORPORATION OF NEW JERSEY.

RECIPROCATING TOOL.

No. 855,515.      Specification of Letters Patent.      Patented June 4, 1907.

Application filed July 27, 1904. Serial No. 218,333.

*To all whom it may concern:*

Be it known that I, HENRY JAMES KIMMAN, a citizen of the United States, residing at Cleveland, county of Cuyahoga, State of Ohio, have invented certain new and useful Improvements in Reciprocating Tools, of which the following specification and accompanying drawings illustrate one form of the invention which I now regard as the best out of the various forms in which the invention may be embodied.

In the drawings, Figure 1 is an axial section of my device, Fig. 2 is a similar section showing the parts in a different position, Fig. 3 a detail view of the valve, Fig. 4 is an external view, Fig. 5 is a cross section on line I—I of Fig. 2, Fig. 6 is a similar section on the line II—II of Fig. 2.

My invention relates to reciprocating tools, driven by fluid pressure—particularly drills. Ordinarily compressed air is the pressure fluid employed, although steam or water or other suitable fluid under pressure may be used in a device embodying all or part of my invention. The invention is exemplified by the construction set forth at length in the following specification and it is particularly designated in the claims appended thereto.

Referring to the drawings, there is shown in Fig. 4 an external view of a tool embodying my invention. The tool is, in general, of a cylindrical form, which form is given it by an external casing, which, as appears more clearly in Figs. 1 and 2, is composed of three principal parts. The part lettered A is the main body of the casing, its interior constituting a cylinder for the piston. The part marked B is a cap forming the handle-end of the instrument—being provided with the handle D, and inclosing the reciprocating valve G and the ratchet mechanism. The part marked C forms the drill-end of the tool and receives the drill or other device to be operated. The three parts are held together by external longitudinal bolts E passing through lugs B on the end-parts B and C of the casing.

Referring to Figs. 1 and 2 which show the interior construction of my device, the piston H is provided at each end with a cylindrical part closely fitting the interior of the main cylinder and these end portions are joined by an intermediate portion having a reduced diameter, leaving a space between it and the interior wall of the cylinder. The lower end of this piston carries a hammer J which is square in cross-section, and enters a correspondingly shaped opening in a bushing W, so that, as the hammer turns from time to time, it will also turn the bushing and with it, the drill. Through the center of the piston passes the rifle-bar I having two spiral grooves on its external surface engaged by corresponding spiral flanges within the piston. The inner end of the bar is attached to the ratchet F, after passing axially through the cylindrical valve G. This ratchet comprises a cylindrical block immediately connected to the bar and in the periphery of this block are seated the pawls $F^3$ on springs $F^1$ (see Fig. 5) which force them radially outward into engagement with ratchet teeth cut in the inner surface of the bushing $F^2$ within the inclosing cap B. By this arrangement, the stroke of the piston in one direction—assuming that it, together with the drill, is held by friction against rotation—will turn the ratchet in a direction permitting the pawl to slip over the teeth.

The valve G (see Figs. 1, 2 and 3) is cylindrical and concentric with the axis of the tool and with the axis of the piston H and ratchet F. To permit the passage through it of the rifle bar I, the valve is provided with a central bushing $G^2$ on which it is capable of sliding longitudinally, while it also has an external tubular valve seat $G^1$ secured rigidly with the bushing $G^2$ and seated in the cylindrical cap portion B of the casing. At its lower end it abuts against the main central portion A.

In the inner wall of the cap portion B are formed two annular passages 1 and 2 (see Figs. 1, 2 and 3) between the said wall and the outer periphery of the valve seat $G^1$. The upper passage 1, is connected with the exhaust port 16, and the lower passage 2 is connected with the inlet port 17, which communicates with the nipple $B^1$ on cap B. On the inner wall of the valve seat $G^1$ are cut out three circumferential grooves marked respectively 5, 6 and 10. These three grooves form the ports controlled by the valve G as it reciprocates to and fro, the valve having on its outer periphery a semi-circular groove $g$ by means of which the central one, 6, of the three ports aforesaid may be put into communication alternately with the upper port, 5, above it or the lower port, 10, beneath it, the said port 5 being in communication with the annular exhaust passage 1 and the lower port 10 with the annular inlet passage 2.

In Figs. 6 the mode of connection between the annular passages 1 and 2 external to the valve seat $G^1$, and the internal grooves or ports 5 and 10 is illustrated. As shown in this figure there is a series of radial openings cut through the wall of the valve seat $G^1$ to put the external passage in communication with the internal port or groove. Fig. 6, being a horizontal section taken at the point II of Fig. 2, illustrates the connection between the external passage 2 and the interior groove 10, which, when the valve is in its upper position (see Fig. 3) is in immediate communication with the annular space 3, which, in turn, is in communication with the external passage 2 by the radial openings aforesaid.

The piston H is at all times subject to a certain degree of air pressure tending to lift it, together with its attached hammer, into its uppermost position as shown in Figs. 2 and 3. This air pressure is applied through the vertical duct 9 which at all times is in communication at its upper end with the annular passage 2 and at its lower end, is in communication with the space below the upper head of the piston formed by the reduced diameter of the piston at its center. This gives an upward pressure upon the piston of a value determined by the area of the exposed annular surface on the under side of its upper head. The piston is operated by the alternate admission of the air to and its exhaustion from the upper surface of the piston. This is accomplished by the reciprocation of the valve G. On the other hand the valve G is itself reciprocated by a similar admission of air to and its exhaustion from the space above its upper side. The valve G, like the piston H, makes its return stroke under the pressure existing at all times on its under side, which is, however, always of lesser value than the operating pressure applied to its upper surface.

In Fig. 1 the valve G is shown in its lowest position with the ports 5 and 6 in communication with each other through the external groove in the periphery of the valve. As appears in Fig. 3, the port 6 is in communication with the upper end of the cylinder of piston H through a duct 12 which is the exhaust duct of the said cylinder. Since the port 5 is in permanent communication with the external annular exhaust passage 1, this lowest position of the valve G is the one which puts the cylinder in communication with the atmosphere through the said duct 12, ports 5 and 6 and annular passage 1. The piston H will therefore rise, under the pressure applied to its under side, as above described, until it comes into the upper position shown in Fig. 2. The upper position of the valve G, as shown in Figs. 2 and 3, will, on the contrary, admit pressure to the upper side of the piston H through the duct 15, which is in communication with the port 10 (see Fig. 3) which, as aforesaid, is in communication with the annular space 3, in which at all times the air pressure is maintained by reason of its permanent communication with the annular inlet passage 2. The admission of the air to the upper side of the piston will cause it to make its power stroke, driving the hammer J down against the head of the drill K.

For producing the reciprocation of valve G, the space above it is connected by means of the duct 8 (shown in dotted lines in Fig. 1 and in full lines in Fig. 2) with the annular space surrounding the central portion of the piston H. The port through which the duct 8 enters the said annular space is however controlled by the lower head of the piston H. Thus in the lower position of the piston, shown in Fig. 1, the said port is uncovered and the air pressure, communicated to the said annular space by means of the duct 9, passes upward therefrom through the duct 8 to the upper side of the valve G, thereby forcing the valve downward against the normal but smaller pressure on its under side. This difference in pressure is due to the difference in area of the surfaces exposed to the respective upward and downward pressures of the air. When the piston H rises to its upper position, as shown in Fig. 2, the lower end of the duct 8 is cut off from the aforesaid annular space around the piston and is permitted to communicate with the space below the piston and around the hammer J, from which space it escapes into the atmosphere through the spaces outside of the hammer J and drill K, which fit but loosely in the bushing W.

The drill K is loosely surrounded by a thin sheet iron tube S seated in the lower part of the sleeve N, which is screwed on to the lower end of a sleeve M projecting down from the bushing W. A collar O, made in two parts, surrounds the reduced neck $K^1$ of the drill, the neck being somewhat longer than the vertical thickness of the collar to permit a slight play of the drill. The upper polygonal extremity of the drill is contained in the tube L, firmly seated in the sleeve M, while the bushing W is itself seated on a rubber cushion P, which rests on an internal shoulder of the lower portion C of the main casing. An air duct 7 (Fig. 1) leads downward from the above mentioned annular passage 2, through the walls of the casing and, at its lower end, communicates with annular space 14 outside of the sleeve M, and inside of the casing C. This, in turn, communicates with duct 18, extending downward between the outside of the tube L and the inside of the sleeve M to the lower extremity of the sleeve whence the air may pass down through the tube S to the extremity of the drill, and there serve to blow out the dust produced by the cutting action of the drill. This air blast at the cutting point of the drill may be shut off when desired by means of a cock Q at the lower end of the duct 7.

While I have described this tool as provided with a handle D intended to facilitate the manual operation of the tool, yet I also contemplate that the same tool may be manipulated by hand or may be mounted on a tripod or other suitable support.

What I claim as new and desire to secure by Letters Patent is:

1. A pneumatic tool comprising a casing having a rotary tool, a reciprocating piston coöperating with said tool, means for rotating the tool by the reciprocation of the piston, and an annular valve controlling the piston and encircling the tool-rotating connection.

2. A percussion apparatus comprising a casing having at one end a rotary tool-holder, tool-rotating means at the other end, a reciprocating piston for operating the tool, and an annular valve controlling said piston and traversed by the tool-rotating connection.

3. A reciprocating tool comprising a casing having a rotary tool-holder at one end, a ratchet at the other end, an annular valve, and a connection between the ratchet and the tool-holder including a reciprocating piston controlled by the valve and connected to rotate the tool-holder, and a rifle-bar connecting the piston with the ratchet and traversing the valve.

4. A pneumatic apparatus comprising a casing having a hollow valve-bearing, tool-operating means in said casing, an annular valve mounted externally upon said bearing and having exterior port-controlling portions for controlling the movements of the tool-operating means, and a tool rotating connection passing through said bearing.

5. A reciprocating tool, comprising, in combination, an external casing, a piston therein, a hammer operated by the piston, a concentric valve, a ratchet and a rifle-bar passing through the said valve and connecting the said ratchet with the said piston.

6. A reciprocating tool provided with a hollow cylindrical valve having both internal and external bearings, one of which contains ports controlled by the valve, in combination with a reciprocating piston on one side of the valve and controlled thereby, a ratchet on the opposite side of the valve, and connecting devices between the ratchet and the piston passing through the center of the said valve and adapted to rotate the piston.

7. A reciprocating tool provided with a cylinder and a tool-operating piston therein, in combination with a cylindrical valve above the piston, a ratchet above the valve, a rifle-bar extending to the ratchet through the valve and into the piston, and a seat for the valve traversed by exhaust ducts for the piston controlled by the valve and by an exhaust duct for the valve controlled by the piston.

8. In a reciprocating tool, the combination with an external casing formed in sections, of a piston contained in one section, a valve concentric with the piston contained in another section, an annular valve-seat external to the valve, a ratchet, and a rifle bar extending therefrom through the said valve into the piston, the said valve-seat being traversed by inlet and exhaust ducts controlled by the piston.

9. A reciprocating tool, comprising, in combination, a piston, a cylindrical valve in line with the piston, a bushing traversing the valve, a ratchet on the opposite side of the valve and a rifle bar passing through said bushing to connect the piston with the ratchet.

10. In a reciprocating tool, the combination with a piston H, a valve G in line therewith and cylindrical in form, a bushing $G^2$ passing through the valve, a ratchet F, a rifle bar I passing through the said bushing into the piston, an annular valve seat $G^1$ having ports on its internal surface controlled by the valve, and an external casing comprising the portion A surrounding the piston and the cap portion B surrounding said valve seat and provided with inlet and exhaust ports communicating by radial ducts with the aforesaid ports on the interior of the valve seat.

In witness whereof I have hereunto set my hand and seal, before two subscribing witnesses, this 21st day of July 1904.

HENRY JAMES KIMMAN.

Witnesses:
M. MILLARD,
J. T. MILLS.